United States Patent
Suh et al.

(10) Patent No.: US 6,762,514 B2
(45) Date of Patent: Jul. 13, 2004

(54) HIGH VOLTAGE DC POWER SUPPLIER

(75) Inventors: Moon Suk Suh, Daejeon (KR); Min Jae Shin, Daejeon (KR); Kyo Jun Choi, Daejeon (KR); In Sik Han, Daejeon (KR); Sun Kyu Jeong, Daejeon (KR); Se Kyu Chung, Daejeon (KR); Tae Whee Joung, Changwon (KR); Hwa Soo Choi, Changwon (KR)

(73) Assignee: Agency for Defense Development, Daejeon (KR)

( * ) Notice: Subject to any disclaimer, the term of this patent is extended or adjusted under 35 U.S.C. 154(b) by 6 days.

(21) Appl. No.: 10/350,243

(22) Filed: Jan. 23, 2003

(65) Prior Publication Data

US 2003/0206421 A1 Nov. 6, 2003

(30) Foreign Application Priority Data

Feb. 5, 2002 (KR) ................................. 10-2002-0006579

(51) Int. Cl.[7] ................................................. F16M 1/00
(52) U.S. Cl. ........................ 307/154; 267/136; 248/636
(58) Field of Search ........................... 307/541; 248/636, 248/550; 267/136, 140.14; 188/267.1; 73/54.01; 324/71.1

(56) References Cited

U.S. PATENT DOCUMENTS 5,267,633 A * 12/1993 Endo et al. .............. 188/267.1

* cited by examiner

*Primary Examiner*—Shawn Riley
(74) *Attorney, Agent, or Firm*—Scully, Scott, Murphy & Presser

(57) ABSTRACT

A high voltage DC power supplier includes: a transformer driven by a switching device, transforming an input voltage to a certain level of high voltage, and outputting the transformed high voltage; a diode and a capacitor for rectifying and smoothing the high voltage outputted from the transformer, and supplying the smoothed voltage to an ER fluid application unit; a discharge circuit for forcibly discharging the output voltage when an output voltage of the capacitor descends; and a controller for controlling a turn-on operation of the switching device on the basis of a difference value between the output voltage and a reference voltage so that the output voltage can follow a target voltage, and outputting a control signal for driving the discharge circuit to the discharge circuit when it reaches a discharge period.

4 Claims, 2 Drawing Sheets

HIGH VOLTAGE DC POWER SUPPLIER

BACKGROUND OF THE INVENTION

1. Field of the Invention

The present invention relates to a high voltage DC power supplier and, more particularly, to a high voltage DC power supplied used for an electro-rheological (ER) fluid application units.

2. Description of the Background Art

In general, a strong electric field is to be formed in fluid in an ER fluid application unit to control a damping factor. The damping factor is adjusted by changing a strength of the electric field. Thus, in order to control the damping factor in the ER fluid application unit, a high voltage DC power supplier is needed to apply a strong electric field and vary a voltage.

The ER fluid application unit has capacitance load characteristics with an equivalent resistance and a capacitor component mixed therein. In order to obtain a fast transient response characteristics, a current should be supplied or cut off at a high speed so that electric charges can be charged quickly in the equivalent capacitor or already charged electric charges can be quickly discharged.

The equivalent resistance value of the ER fluid application unit varies depending on an applied voltage of both ends. That is, the equivalent resistance value is in inverse proportion to the applied voltage and exponentially changes. Accordingly, if the applied voltage is high, a resistance value is small and thus a high current flows. Meanwhile, if an applied voltage is '0', the resistance value is infinite and thus no current flows. This will now be described with reference to FIG. 1.

FIG. 1 is a circuit diagram of a high voltage DC power supplier in accordance with a conventional art.

As shown in FIG. 1, the high voltage DC power supplier includes: a transformer T1 for transforming an input voltage (Vs) to a high voltage of a certain level according to an electromagnetic induction operation, and outputting the transformed high voltage; a MOS transistor M1, a main switching device, for driving the transformer T1; and a diode D1 and a capacitor C1 for rectifying and smoothing the high voltage excited through secondary coil of the transformer T1 and supplying the smoothed voltage toward an ER fluid application unit.

The operation of the high voltage DC power supplier will now be described with reference to FIG. 2.

FIG. 2 is a graph showing discharge characteristics of an output voltage of FIG. 1.

First, the MOS transistor M1 is repeatedly turned on/off at a certain period by a controller (not shown). When the MOS transistor M1 is turned on, the input voltage (Vs) flows through the primary coil of the transformer T1 and the MOS transistor M1, according to which a high voltage with a certain level is excited in the secondary coil of the transformer T1.

The high voltage excited in the secondary coil of the transformer T1 is rectified by the diode D1 and smoothed by the capacitor C1, and an output voltage (Vo) of the capacitor C1 is supplied to the ER fluid application unit. The ER fluid application unit signifies an equivalent circuit 1 of the ER fluid application unit.

For reference, a ratio (Vo/Vs) of the input/output voltage is determined by a duty ratio of the MOS transistor M1 and a turn ratio of the primary and secondary coils of the transformer T1.

However, the high voltage DC power supplier with the structure as shown in FIG. 1 has a difficulty obtaining quick response characteristics when an output voltage (Vo) descends. The reason is because, in order to obtain quick response characteristics, the electric charges stored in the capacitors (C1, CL) should be quickly discharged when the output voltage (Vo) descends, but the electric charges are not transmitted to the secondary coil of the transformer T1 by the diode D1 and when the output voltage (Vo) is low, the resistance (RL) value is very high and thus the discharge time constant is increased. Therefore in the high voltage DC power supplier in accordance with the conventional art, since the output voltage (Vo) is gradually discharged as shown in FIG. 2, it fails to obtain a quick response characteristics.

As aforementioned, the conventional high voltage DC power supplier fails to obtain quick response characteristics since the voltage stored in the capacitor is gradually discharge when the output voltage descends in terms of the circuit characteristics.

SUMMARY OF THE INVENTION

Therefore, an object of the present invention is to provide a high voltage DC power supplier that is capable of quickly discharging a voltage stored in a capacitor by additionally installing a discharge circuit with a simple construction in an output stage of a high voltage DC power supplier and driving the discharge circuit at every discharge time point.

To achieve these and other advantages and in accordance with the purpose of the present invention, as embodied and broadly described herein, there is provided a high voltage DC power supplier including: a transformer driven by a switching device, transforming an input voltage to a certain level of high voltage, and outputting the transformed high voltage; a diode and a capacitor for rectifying and smoothing the high voltage outputted from the transformer, and supplying the smoothed voltage to an ER fluid application unit; a discharge circuit for forcibly discharging the output voltage when an output voltage of the capacitor descends; and a controller for controlling a turn-on operation of the switching device on the basis of a difference value between the output voltage and a reference voltage so that the output voltage can follow up a target voltage, and outputting a control signal for driving the discharge circuit to the discharge circuit when it reaches a discharge period.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A high voltage DC power supplier that is capable of quickly discharging a voltage stored in a capacitor by installing a discharge circuit with a simple construction at an output stage of a high voltage DC power supplier and driving the discharge circuit whenever it reaches a discharge time point, in accordance with a preferred embodiment of the present invention will now be described with reference to FIGS. 3 and 4.

Figure 3:
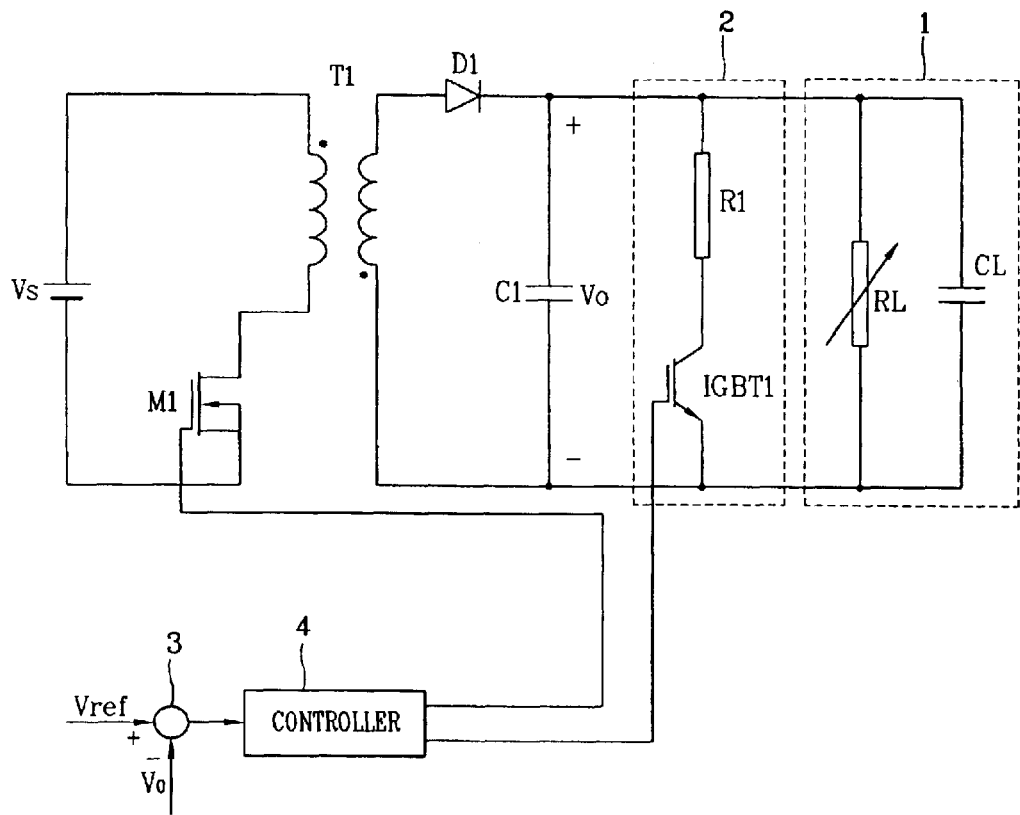
FIG. 3 is a circuit diagram of a high voltage DC power supplier in accordance with the present invention.

FIG. 3 is a circuit diagram of a high voltage DC power supplier in accordance with the present invention.

As shown in FIG. 3, a high voltage DC power supplier in accordance with the present invention includes: a transformer T1 for transforming an input voltage (Vs) to a certain level of high voltage, and outputting the transformed high voltage; a MOS transistor M1, a main switching device, for driving the transformer T1; a diode D1 and a capacitor C1 for rectifying and smoothing a high voltage excited through a secondary coil of the transformer T1, and supplying the smoothed voltage to an ER fluid application unit (signifying an equivalent circuit 1 of the ER fluid application unit); a discharge circuit 2 for quickly discharging forcibly an output voltage (Vo) when the output voltage (Vo) of the capacitor C1 descends; a subtracter 3 for comparing the output voltage (Vo) of the capacitor C1 with a reference voltage (Vref) and obtaining a difference value therebetween; and a controller 4 for controlling a turn-on operation of the MOS transistor (M1) on the basis of the difference value outputted from the subtracter 3 so that the output voltage (Vo) can follow up a target voltage, and outputting a control signal for driving the discharge circuit 2 to the discharge circuit 2 on the basis of the difference value whenever it reaches a discharge period.

The discharge circuit 2 of the high voltage DC power supplier consists of a resistance R1 and a power transistor (IGBT1) connected in parallel to the capacitor C1. The resistance R1 and the power transistor IGBT1 are connected in series.

The operation of the high voltage DC power supplier will now be described.

Figure 1:
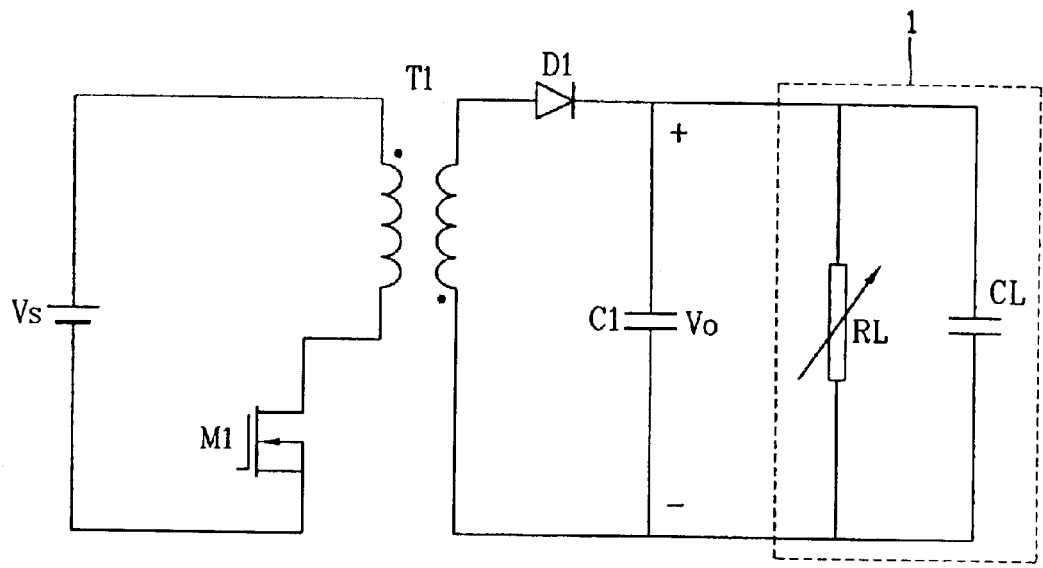
FIG. 1 is a circuit diagram of a high voltage DC power supplier in accordance with a conventional art.
Figure 2:
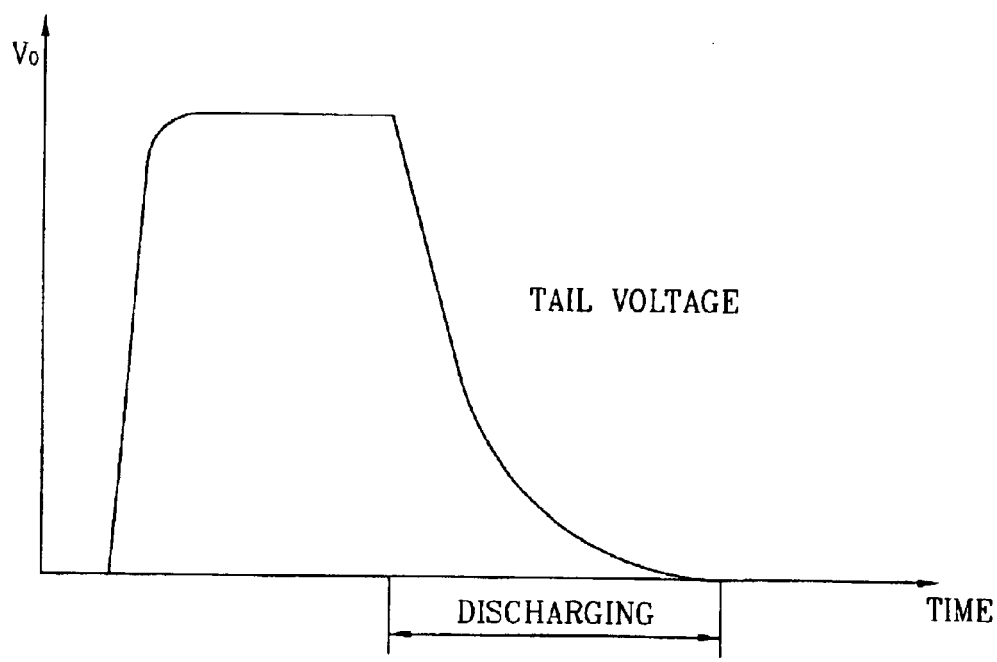
FIG. 2 is a graph showing discharge characteristics of an output voltage of FIG. 1.

First, the operation of the high voltage DC power supplier of the present invention is the same as that of the high voltage DC power supplier of FIG. 1, except for the discharge operation.

That is, the MOS transistor M1 is repeatedly turned on and off at a certain period by the controller 4. When the MOS transistor M1 is turned on, an input voltage (Vs) flows through the primary coil of the transformer T1 and the MOS transistor M1, according to which a certain level of high voltage is excited in the secondary coil of the transformer T1. The high voltage excited in the secondary coil of the transformer T1 is rectified by the diode D1 and smoothed by the capacitor C1, and then the output voltage (Vo) of the capacitor C1 is supplied to the ER fluid application unit.

The subtracter 3 compares the output voltage (Vo) of the capacitor C1 with the reference voltage (Vref) to obtain a difference value, and the controller 4 determines a turn-on period of the MOS transistor M1 on the basis of the difference value so as for the output voltage (Vo) to follow up a target voltage.

Meanwhile, whenever the output voltage (Vo) of the capacitor C1 descends, the discharge circuit 2 is driven under the control of the controller 4 and the output voltage (Vo) of the capacitor C1 is rapidly discharged, so that quick voltage response characteristics can be obtained. This operation will now be described in detail with reference to FIG. 4.

Figure 4:
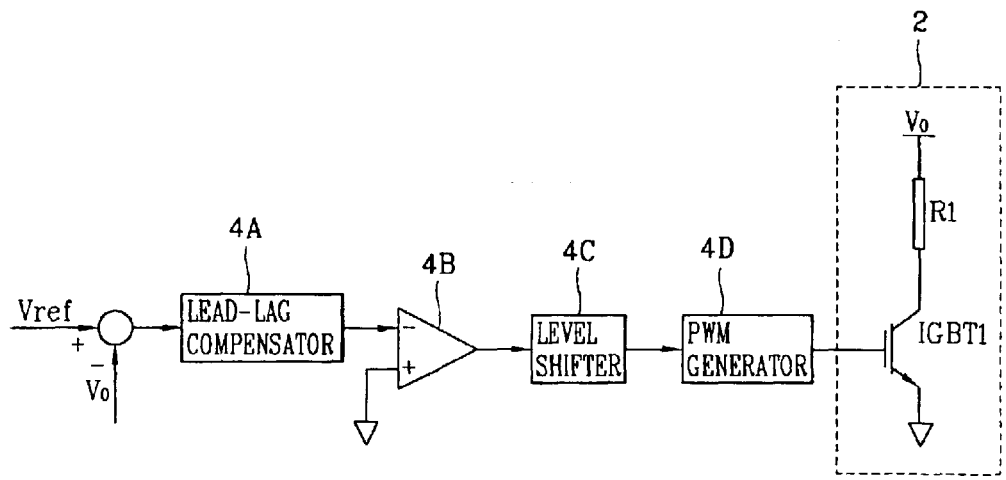
FIG. 4 is a block diagram showing the construction of a controller of FIG. 3.

FIG. 4 is a block diagram showing the construction of a controller of FIG. 3.

As shown in FIG. 4, the controller 4 includes a lead-lag compensator 4A for generating a control voltage on the basis of the difference value for the output voltage (Vo); a Schmitt trigger circuit 4B for outputting a positive (+ plus) square-wave pulse of an interval corresponding to a negative control voltage when the negative (− minus) control voltage is outputted from the lead-lag compensator 4A; a level shifter 4C for shifting the square-wave pulse to a certain level of voltage, and outputting the shifted certain level of voltage; and a pulse width modulation signal generator 4D for generating a pulse-width modulation (PWM) signal corresponding to the voltage outputted from the level shifter 4C and controlling driving of the discharge circuit 2 on the basis of the generated pulse width modulation signal.

The level shifter 4C may shift the control voltage outputted from the lead-lag compensator 4A to a certain level of voltage without passing through the Shmitt trigger circuit 4B.

First, the lead-lag compensator 4A performs its inherent phase control function and generates a control voltage on the basis of the difference value outputted from the subtracter 3. At this time, the lead-lag compensator 4A outputs a positive (+ plus) control voltage at a rise time of the output voltage (Vo) and a negative (−) control voltage at a fall time of the output voltage (Vo).

When the positive control voltage is outputted from the lead-lag compensator 4A, no pulse width control signal is supplied to a gate of the power transistor IGBT1. Thus, the power transistor IGBT1 is maintained in an OFF state.

However, when the negative control voltage is outputted from the lead-lag compensator 4A, a hysteresis circuit, that is, for example, the Shmitt trigger circuit 4B, outputs a positive square-wave pulse of an interval corresponding to the negative control voltage. At this time, the positive square-wave pulse is shifted to a certain level of voltage (square-wave pulse) through the level shifter 4C, and the thusly shifted certain level of voltage (square-wave pulse) is supplied to the pulse width modulation signal generator 4D.

The pulse width modulation signal generator 4D outputs the pulse width modulation signal corresponding to the square-wave pulse which has been shifted to a certain level of voltage, to the power transistor IGBT1, and accordingly, the power transistor IGBT1 is turned on.

Then, the voltage charged in the capacitor C1 and the equivalent capacitor CL is discharged to the ground terminal through the resistance R1 and the power transistor IGBT1. At this time, since the time constant (T) is determined by multiplying the resistance (R1) and the two capacitors (C1+CL) together (that is, T=R1(C1+CL)), if the value of resistance (R1) is set small sufficiently, quick response characteristics can be obtained. That is, whenever it reaches the discharge time point, the discharge circuit 2 is driven to quickly discharge the voltage stored in the capacitor.

For reference, when the level of the control voltage outputted from the lead-lag compensator 4A is a zero-crossing level, the MOS transistor (M1) and the power transistor IGBT1 may be turned on at the same time due to their on/off delay time, noise or the like, and thus, an overcurrent may flow to the MOS transistor M1. In order to prevent this, the Shmitt trigger circuit 4B is used.

Meanwhile, the high voltage DC power supplier of the present invention can be used to control the ER fluid application unit such as a semi-active suspensions of vehicles, high speed clutches, semi-active vibration isolators.

As so far described, the high voltage DC power supplier (a flyback converter) of the present invention has the following advantages.

That is, the discharge circuit with a simple construction is added to the output terminal of the high voltage DC power supplier and driven whenever it reaches a time point when the output voltage descends, thereby quickly discharging the voltage charged in the capacitor.

In addition, by quickly discharging the voltage stored in the capacitor of the high voltage DC power supplier, a high voltage DC power supplier exerting excellent control characteristics can be implemented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A high voltage DC power supplier comprising:
a transformer driven by a switching device, transforming an input voltage to a certain level of high voltage, and outputting the transformed high voltage;
a diode and a capacitor for rectifying and smoothing the high voltage outputted from the transformer, and supplying the smoothed voltage to an ER fluid application unit;
a discharge circuit for forcibly discharging the output voltage when an output voltage of the capacitor descends; and
a controller for controlling a turn-on operation of the switching device on the basis of a difference value between the output voltage and a reference voltage so that the output voltage can follow up a target voltage, and outputting a control signal for driving the discharge circuit to the discharge circuit when it reaches a discharge period.

2. The power supplier of claim 1, wherein the discharge circuit comprises a resistance and a power transistor connected in parallel to the capacitor, the resistance and the power transistor are connected to each other in series.

3. The power supplier of claim 1, wherein the controller comprises:
a lead-lag compensator for generating a control voltage on the basis of the difference value;
a level shifter for shifting the control voltage outputted from the lead-lag compensator to a certain level of voltage; and
a pulse width modulation signal generator for generating a pulse width modulation signal corresponding to the voltage shifted by the level shifter, and controlling driving of the discharge circuit on the basis of the generated pulse width modulation signal.

4. The power supplier of claim 3, wherein the controller further comprises a Shmitt trigger circuit for outputting a square-wave pulse according to a positive or a negative control voltage outputted from the lead-lag compensator.

* * * * *